Figure 1:
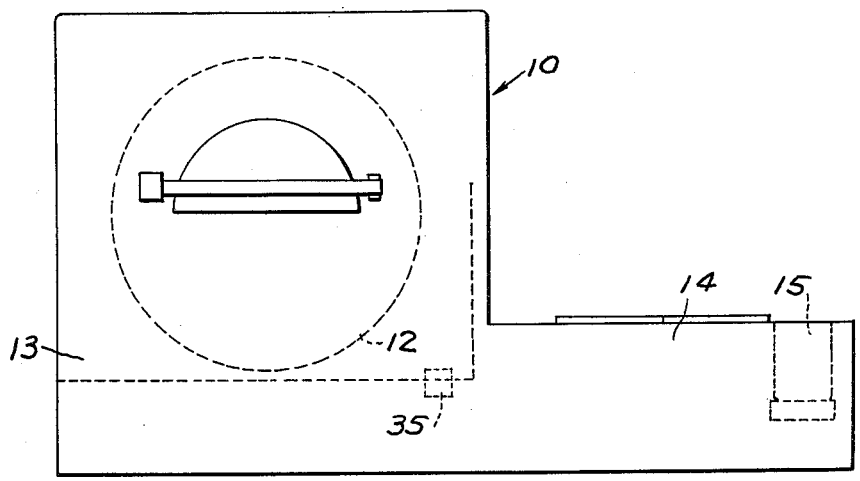

June 11, 1963 M. W. BROWN ETAL 3,093,442
METHOD AND APPARATUS FOR CONTROLLING THE RELATIVE
HUMIDITY OF DRY CLEANING SYSTEMS
Filed Aug. 8, 1955 2 Sheets-Sheet 1

INVENTORS
MALCOLM W. BROWN & JACK W. STEAD.
BY
ATTORNEYS.

June 11, 1963 M. W. BROWN ETAL 3,093,442
METHOD AND APPARATUS FOR CONTROLLING THE RELATIVE
HUMIDITY OF DRY CLEANING SYSTEMS
Filed Aug. 8, 1955 2 Sheets-Sheet 2

INVENTORS
MALCOLM W. BROWN & JACK W. STEAD.
BY
Barnes, Kiselle, Laughlin & Raisch
ATTORNEYS.

United States Patent Office 3,093,442
Patented June 11, 1963

3,093,442
METHOD AND APPARATUS FOR CONTROLLING THE RELATIVE HUMIDITY OF DRY CLEANING SYSTEMS
Malcolm W. Brown and Jack W. Stead, Dearborn, Mich., assignors to Eaton Chemical and Dyestuff Company, Detroit, Mich., a corporation of Michigan
Filed Aug. 8, 1955, Ser. No. 526,981
4 Claims. (Cl. 8—142)

This invention relates to dry cleaning of garments and the like and particularly to a method and apparatus for controlling the relative humidity of the solutions in dry cleaning systems.

In present-day dry cleaning systems, the cleaning solution comprises a solvent of the petroleum or chlorinated type, to which is often added a detergent. It is also good practice to add a small quantity of water periodically in order to maintain or control the relative humidity of the solution, since it has been determined that the relative humidity of the solution is important in the dry cleaning operation. A low relative humidity will result in poor cleaning of the garments whereas a high relative humidity may result in damage to the garments. The National Institute of Dry Cleaners has recently determined that the relative humidity of the solution should range between 70 and 85 percent for best results.

It is apparent that the periodic manual addition of water makes the dry cleaning operation subject to the human element. Moreover, the addition of plain water may result in inadequate distribution of the water in the solution. For best results the water should be added in the form of an emulsion. If the water is not added in the form of an emulsion, then the emulsifying action must be supplied by materials already in the cleaning solution, for example, by the detergent, to prevent the deposition of free water particles on the garments. Since the amount of detergent may vary, this often results in an uncontrolled amount of water in the system.

Accordingly, various methods have been suggested for controlling the relative humidity of the dry cleaning system. According to one method the electrical conductivity of the solution is measured directly and water is added to the system in response to fluctuations in the conductivity of the solution, thereby attempting to control the relative humidity of the solution by measuring the moisture content of the solution rather than the relative humidity of the solution. Such a system is subject to great variations due to fluctuations in the conductivity of the solution caused by other materials in the solution, for example, detergents, metal parts of the garments and the like or by changes in temperature. In addition, since the conductivity of the solution is measured rather than the relative humidity, the system does not respond immediately to changes in the relative humidity. Moreover, changes in temperature change the conductivity and the relative humidity different amounts. Thus, by measuring the conductivity of the solution, the amount of water to be added may be more or less than that required to maintain the desired relative humidity.

According to another method which has been suggested, the relative humidity of the solution is measured by placing a sensing element in the vapor above the solution which is present in the washing section of the machine during the washing and automatically adding water in response to fluctuations of the relative humidity of the solution in the washer. Such a system is inaccurate in that it is subject to fluctuations in the relative humidity of the vapor in the washing section of the machine caused by the insertion of the garments and by the opening and closing of the doors or covers to the machine for loading and inspecting the machine. In addition, in each of the methods heretofore suggested the addition of water, rather than water emulsion, to the solution does not insure the distribution of the water particles throughout the solution and may result in a deposition of pure water on the garments, causing the garments to be damaged. Since the amount of detergent may vary, the emulsifying action of the detergent cannot be relied upon to provide the required amount of water throughout the solution. It should be noted here that the amount of water in the solution necessary to create a relative humidity of 70 to 85 percent is very small, and may be on the order of less than 1.0 percent of the entire solution.

It is therefore an object of this invention to provide a method and apparatus for controlling the relative humidity of dry cleaning solutions which will accurately measure the relative humidity and maintain the relative humidity at the desired level by adding water preferably in the form of a water-in-oil emulsion.

According to the invention, a portion of the dry cleaning solution is passed through an airtight chamber and an atmosphere of the cleaning solution vapor is created in the chamber. A sensing device, having a sensing element positioned in the chamber, measures the relative humidity of the solution. The sensing device actuates an automatic mechanism for replenishing the moisture content of the solution when the relative humidity passes below a predetermined value. The water is preferably added in the form of a water-in-oil emulsion which insures the proper distribution of the water throughout the dry cleaning solution. The airtight chamber is preferably provided in the line extending between the filter of the dry cleaning system and the dry cleaning machine per se. In addition, the water emulsion is preferably added to the solution as it enters the airtight chamber, thereby insuring a prompt response of the sensing element and preventing the addition of an excess of water to the system.

Figure 2:
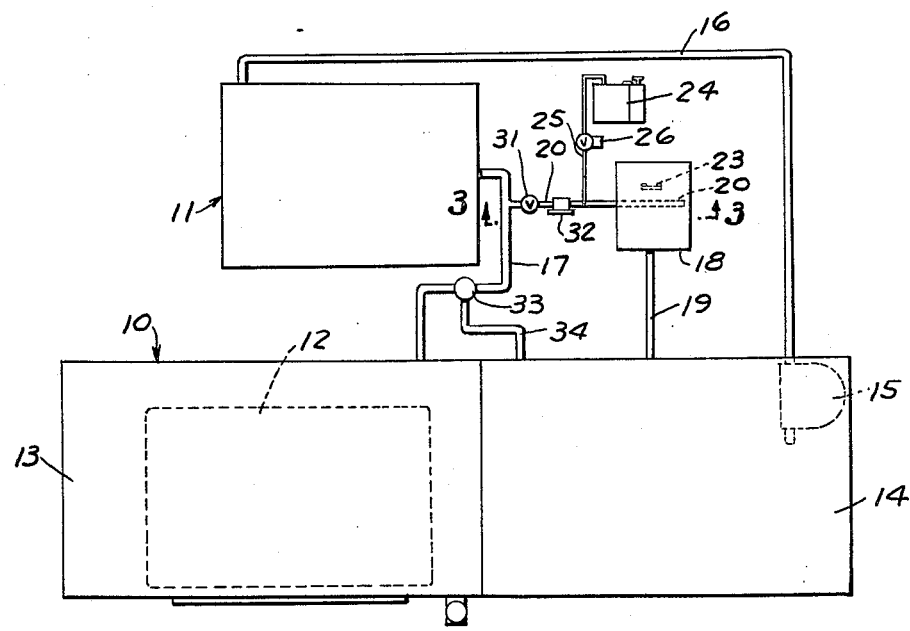
Figure 3:
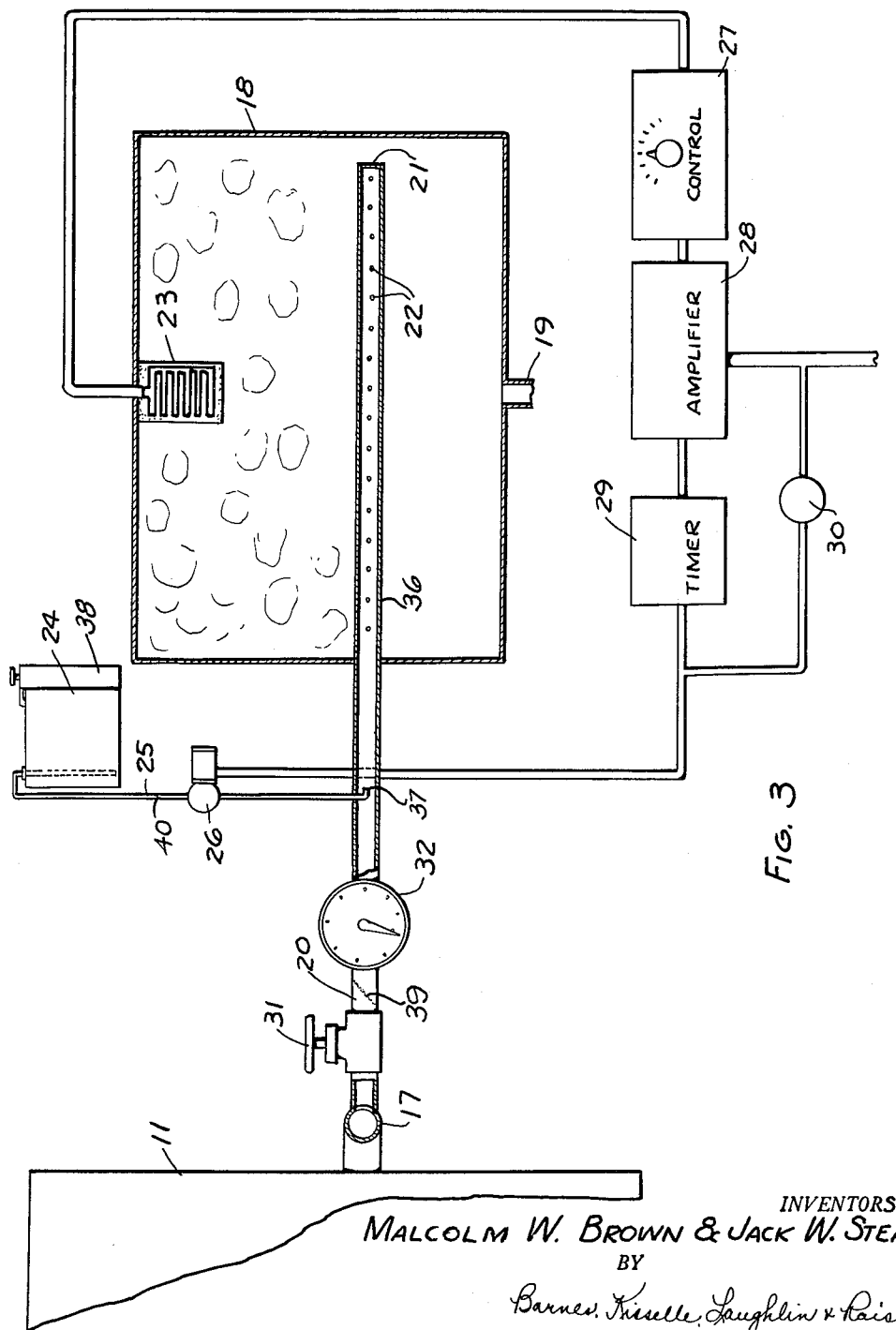

In the drawings:
FIG. 1 is a diagrammatic front elevational view of a dry cleaning apparatus embodying the invention.
FIG. 2 is a diagrammatic plan view of the apparatus.
FIG. 3 is a diagrammatic, part sectional elevational view of the apparatus for measuring the relative humidity and adding the water emulsion, taken at the line 3—3 on FIG. 2, and including a schematic wiring diagram for the apparatus.

Referring to FIGS. 1 and 2, a typical dry cleaning system may comprise a dry cleaning machine 10 and a filter 11. The dry cleaning machine 10 includes a cylindrical basket called a wheel 12 into which the garments are placed. The wheel is rotatably mounted and driven about a horizontal axis to move the garments through the cleaning solution and to drain the excess of cleaning solution from the garments by centrifugal force, as required. The cleaning machine may be divided into two sections, the cleaning section 13 in which the wheel is positioned and the tank section 14 in which the cleaning solution is stored. A pump 15 may be positioned in the tank section 14 for pumping the solution from the tank to the filter through a connecting pipe 16. After passing through the filter, the solution returns to the cleaning section 13 of the machine by means of a pipe 17.

A two-way valve 33 is provided in the pipe 17 and is operable in one position to direct solution into the cleaning section 13 through pipe 17 and in another position into the tank section 14 through pipe 34. The tank section 14 extends below the washing section 13 and a valve 35 is provided in the bottom of the washing section 13 to permit the draining of solution from the washing section into the tank section 14.

The cleaning solution may comprise a solvent such as petroleum solvent or chlorinated solvent together with a detergent. The detergent should be of the type which is soluble in petroleum or chlorinated solvents and capable of dispersing loose soil particles and preventing them from being redeposited on the garments. It is also helpful if the detergent is capable of facilitating solution of the water in the solvent.

In normal operation of a machine such as that described, after a batch of garments is placed in the wheel 12, the pump 15 is operated to cause the flow of solution from the tank section 14 to the filter 11 through pipe 16. The valve 33 is the pipe 17 is then in position to direct the solution into the cleaning section 13. After the cleaning section 13 is filled to the desired level, the valve 33 is turned to direct the solution to the tank section 14 through pipe 34. The wheel is then rotated to clean the garments. After a predetermined period, depending on the nature and condition of the garments, the valves 33 and 35, the latter serving as a drain, are turned to permit the continuous circulation of the solution from the tank section 14, through the filter 11, to the washing section 13 and back to the tank section 14. Throughout this interval the wheel 12 is continuously rotating. Finally, the valve 33 is turned, with valve 35 open, permitting the solution to drain into the tank section 14 and the rotation of the wheel 12 is continued or increased to extract the major portion of the solvent from the garments by centrifugal action. In the arrangement shown, the level of the solution in tank 14 is at all times below the drain valve 35.

According to the invention as shown in FIGS. 1 and 2, a line 20 is provided in the pipe 17 for directing a portion of the solution emanating from the filter to a chamber 18. A line 19 returns the solution from the chamber to the tank 14.

Referring to FIG. 3, the line 20 includes a portion 36 extending into the chamber and a cap 21 provided on the end of the line. A multiplicity of laterally extending openings 22 is provided in the pipe, whereby the solution is directed outwardly in fine streams, creating an atmosphere of vapor. The line 19 extends from the bottom of the chamber, permitting the solution to flow into the tank. By this construction, a portion of the dry cleaning solution is continuously passed through the chamber 18 and an atmosphere of vapor is created in the chamber.

A sensing element 23 is positioned within the chamber and at the upper part thereof in order to measure the relative humidity of the vapor. The relative humidity of the solution is equal to that of the vapor. The sensing element may be of the type comprising an electrical resistance which is variable in accordance with the humidity of the atmosphere surrounding the resistance. Such types are commercially available and well known. A container 24 is positioned at a level above the chamber and a line 25 extends between the chamber and the pipe 20. The container is filled with water, preferably in the form of a water-in-oil emulsion. A solenoid operated control valve 26 is positioned in the line 25 for controlling the flow of water emulsion to the solution. The opening and closing of the valve is controlled by the sensing element 23, as presently described. The line 25 extends into the line 20 and is bent in the direction of flow with the outlet at 37.

Instead of positioning the container 24 at a level above the chamber, the container may be closed and positioned at any level with pressure applied to the solution whereby the water emulsion is introduced to the solution under pressure. The pressure may be supplied by means of a hand pump 38 which may be actuated periodically to maintain pressure on the solution.

The water emulsion includes a mixture of water, an oil constituent and an emulsifier capable of forming a water-in-oil suspension. Emulsifiers which may be used are well known and include the classes such as alklated aryl polyether alcohol, dioctyl ester of sodium sulfosuccinic acid and alkyl aryl sulfonate. The oil constituent must be a chlorinated solvent and is preferably the same as the cleaning solvent in which case the distribution of the water in the dry cleaning solution is further facilitated. For example, the mixture may comprise one part emulsifier, 25 parts water and 25 parts solvent.

The sensing element 23 comprises a portion of a sensing device which is adapted to energize the solenoid operated valve 26 when the relative humidity in the chamber 18 is below a predetermined value. The sensing element is preferably of the type which has a variable resistance dependent upon the relative humidity. Such an element 23 is electrically connected to an adjustable control 27. The control includes a balancing circuit such as a Wheatstone bridge and means for varying the resistance of the bridge to set the sensing element for various levels of humidity. When the resistance of the sensing element increases, by a decrease in relative humidity to a point above the setting of control 27, a signal is sent to the amplifier 28 which amplifies the signal and, by means of a relay, completes the circuit to the solenoid of the valve 26 causing the valve to be opened and permitting the flow of water emulsion into the dry cleaning system.

A time control mechanism 29 is preferably included in the system in order to deenergize the solenoid in the event that the valve remains open for a predetermined excessive length of time, such as might occur upon failure in some manner of control 27. In this manner, the inadvertent addition of too much water to the system is prevented. The time control is preferably of the type which must be reset after it has once become actuated.

A bypass switch 30 may also be inserted in the system for bypassing the control mechanism and energizing the solenoid operated valve 26 to provide water to the system when initially charging the system.

A hand valve 31 may also be provided in the line 20 to completely cut out the humidity control system in the event that it is desired to use the dry cleaning system without water or to use the manually operated methods of the prior art. A flow meter 32 is also included in the line 20. Screens or filters 39 and 40 may be provided in lines 20 and 25, respectively. Filter 39 prevents the filter powder from the filter from being transferred to the remainder of the system, and filter 40 prevents any sediment or the like from clogging the water emulsion addition system.

The operation may be summarized as follows: With the pump 15 operating, solution is continuously pumped to the filter 11 through pipe 16 and thence to the machine through pipe 17. A part of the solution is bypassed through the line 20 and the pipe 36 into the airtight chamber 18 where it is laterally projected in fine streams through the openings 22. The solution passes from the chamber 18 through the line 19, back to the dry cleaning machine. By this continuous circulation, an atmosphere of vapor is created in the airtight chamber 18 to which the sensing element 23 is subjected.

With the control 27 set at a predetermined relative humidity, when the humidity in chamber 18 falls below that level, the sensing device, comprising the control 27 and amplifier 28, will energize the solenoid of the valve 26 permitting water in the form of a water-in-oil emulsion to flow from the tank 24 through the line 25 to the line 20. The water emulsion emerging from outlet 37 is mixed with the solution which is passing through the airtight chamber 18. The addition of the water emulsion just prior to passage of the solution into the chamber will necessarily cause an immediate increase in the relative humidity of the solution, and the sensing element together with the sensing device will immediately be actuated to deenergize the solenoid of the valve 26 and cut off the flow of water emulsion to the system. Continued circulation of the solution into the airtight chamber will again cause the sensing element to energize the solenoid. This successive energization and deenergization of the solenoid operated valve 26 will cause the water emulsion to be added in small increments and thus prevent the addition of too much water to the system, resulting in a very accurate control of the relative humidity of the solution.

It should be understood that the sensing element and sensing device may be of various types and construction which are commercially available. However, the sensing element which comprises a variable resistance, the value of which is dependent upon the relative humidity, coupled with a Wheatstone bridge control and an amplifier, has been found to give very satisfactory results.

It can thus be seen that there has been provided a method and apparatus for continuously and accurately measuring the relative humidity of the solution. The method is not affected by temporary fluctuations in the relative humidity caused by opening and closing the cleaning section of the cleaning machine. This has been assured by passing a portion of the solution through an airtight chamber remote from the cleaning section of the machine. In addition, such accurate and continuous measurement has been utilized to accurately control the relative humidity of the solution. The preferred point at which the relative humidity is measured, namely, as the solution is returned from the filter to the cleaning machine, permits a measurement of the relative humidity of the solution as it is actually being presented for application to the garments.

By adding the water emulsion slightly in advance of the point where the relative humidity is measured, the relative humidity is immediately increased and the supply of water emulsion cut off, thereby preventing the oversupply of water to the solution and the resultant damage to the garments. If the water emulsion is added under pressure, a more constant amount of water emulsion is provided to the system, thus reducing the number of successive energizations and deenergizations of the solenoid operated valve 26, necessary to provide the required amount of water in order to maintain the relative humidity of the solution.

The addition of the water emulsion also permits operation of the system by continuous circulation with the filter in the circuit at all times, obviating the necessity of bypassing the flow from the filter at various times during the cleaning operation, and resulting in substantial savings in time. In addition, redeposition of soil on the clothes is avoided.

The use of a water emulsion permits a smaller amount of water to be added at any one interval, thus providing a more accurate control than would be possible if pure water were added to the system. Since, when an emulsion is used, emulsifier is always added when water is added, the presence of enough emulsifier is assured to obtain the proper distribution of the water particles throughout the entire solution.

We claim:

1. The method of controlling the relative humidity of a liquid dry cleaning solution in a dry cleaning system which comprises spraying dry cleaning solution continuously into an air tight chamber and thereby creating an atmoshpere of vapor from said solution in said chamber, continuously removing the dry cleaning solution from said air tight chamber, continuously measuring the relative humidity of the vapor in said chamber, and adding water to the dry cleaning solution as it is sprayed into said chamber when the relative humidity is below a predetermined amount.

2. The method of controlling the relative humidity of a liquid dry cleaning solution in a dry cleaning system wihch comprises introducing dry cleaning solution continuously into an air tight chamber, creating an atmosphere of vapor from said solution as it is introduced into said chamber, continuously removing dry cleaning solution from said chamber, continuously measuring the relative humidity of the vapor in said chamber, and adding water to the dry cleaning solution as it is introduced into said chamber when the relative humidity is below a predetermined amount.

3. In an apparatus for controlling the relative humidity of a liquid dry cleaning solution, the combination comprising a dry cleaning system through which said liquid solution is circulated, an air tight chamber, said chamber having an inlet through which a portion of said liquid solution is continuously introduced into said chamber and an outlet through which said liquid solution is removed from said chamber, a sensing device including a sensing element positioned in said chamber, spray means in said inlet of said chamber for creating an atmosphere of vapor from said liquid solution as it is introduced through said inlet into said chamber, and means actuated by the sensing device for adding water to the dry cleaning system at said inlet to said chamber.

4. In an apparatus for controlling the relative humidity of a liquid dry cleaning solution, the combination comprising a dry cleaning system through which said liquid solution is circulated, an air tight chamber, said chamber having an inlet through which a portion of said liquid solution is continuously introduced into said chamber and an outlet through which said liquid solution is removed from said chamber, a sensing device including a sensing element positioned in said chamber, means for creating an amosphere of vapor from said liquid solution as it is introduced through said inlet into said chamber, and means actuated by the sensing device for adding water to the dry cleaning system at said inlet to said chamber.

References Cited in the file of this patent

UNITED STATES PATENTS

| | | |
|---|---|---|
| 2,276,681 | Allison | Mar. 17, 1942 |
| 2,602,589 | Basinger | July 8, 1952 |
| 2,715,833 | Fulton et al. | Aug. 23, 1955 |
| 2,720,213 | Whitcomb | Oct. 11, 1955 |
| 2,762,218 | Ohlheiser | Sept. 11, 1956 |

FOREIGN PATENTS

| | | |
|---|---|---|
| 602,402 | Great Britain | May 26, 1948 |
| 1,083,647 | France | June 30, 1954 |
| 530,617 | Canada | Sept. 18, 1956 |

OTHER REFERENCES

National Inst. of Cleaning and Dyeing (N.I.C.D.) Technical Bulletin No. 7–292, October 30, 1952, Silver Spring, Md. (4 pp.).

Fulton et al.: "Detergents in Drycleaning," A.S.T.M. Bulletin No. 192, September 1953, pp. 63–68.